United States Patent
DeAngelo (10) Patent No.: US 10,330,884 B2
(45) Date of Patent: Jun. 25, 2019

(54) MOUNTING OF OPTICAL ELEMENTS FOR IMAGING IN AIR VEHICLES

(71) Applicant: Rosemount Aerospace Inc., Burnsville, MN (US)

(72) Inventor: Timothy DeAngelo, Edina, MN (US)

( * ) Notice: Subject to any disclaimer, the term of this patent is extended or adjusted under 35 U.S.C. 154(b) by 158 days.

(21) Appl. No.: 15/437,321

(22) Filed: Feb. 20, 2017

(65) Prior Publication Data
US 2018/0239103 A1    Aug. 23, 2018

(51) Int. Cl.
  *B64D 47/08* (2006.01)
  *G02B 7/02* (2006.01)
  *H04N 5/225* (2006.01)
  *H04N 7/18* (2006.01)

(52) U.S. Cl.
  CPC ............ *G02B 7/022* (2013.01); *B64D 47/08* (2013.01); *G02B 7/021* (2013.01); *G02B 7/025* (2013.01); *H04N 5/2253* (2013.01); *H04N 7/183* (2013.01)

(58) Field of Classification Search
None
See application file for complete search history.

(56) References Cited

U.S. PATENT DOCUMENTS

| | | | |
|---|---|---|---|
| 4,018,405 A | 4/1977 | Baker | |
| 6,122,114 A | 9/2000 | Sudo et al. | |
| 8,208,209 B2 | 6/2012 | Lee et al. | |
| 2007/0139528 A1 | 6/2007 | Chang | |
| 2008/0100932 A1 | 5/2008 | Noda et al. | |
| 2012/0002306 A1* | 1/2012 | Takahashi | G02B 7/023 359/813 |
| 2013/0081666 A1* | 4/2013 | Yoon | H01L 25/0753 136/205 |
| 2015/0034512 A1* | 2/2015 | Moffat | B65D 85/38 206/316.1 |
| 2015/0160345 A1* | 6/2015 | Hines | G02B 5/09 250/203.4 |
| 2015/0234149 A1* | 8/2015 | Kreitzer | G02B 15/16 348/240.3 |
| 2015/0273898 A1 | 10/2015 | Kataoka et al. | |
| 2015/0370034 A1 | 12/2015 | Kasuga | |
| 2018/0077350 A1* | 3/2018 | Grenier | H04N 5/247 |

FOREIGN PATENT DOCUMENTS

| | | |
|---|---|---|
| GB | 1485619 A | 9/1977 |
| JP | 2002251769 A | 9/2002 |
| WO | WO2009000591 A1 | 12/2008 |

OTHER PUBLICATIONS

Extended European Search Report for EP Application No. 18156036.8, dated Jun. 19, 2018, 8 pages.

* cited by examiner

*Primary Examiner* — Eileen M Adams
(74) *Attorney, Agent, or Firm* — Kinney & Lange, P.A.

(57) ABSTRACT

An optical assembly comprises a mounting structure, a plurality of optical elements, and a conformal filler material. The mounting structure has a plurality of axially spaced circumferentially recessed undercuts formed into an inner surface of the mounting structure. The optical elements are axially spaced in the mounting structure. At least one of the optical elements includes an undercut in a perimeter edge surface. The undercut is aligned with one of the plurality of undercuts in the mounting structure, such that the aligned circumferential undercuts define a void. The conformal filler material is cast in place in the void to create a mechanical lock between the optical element and mounting structure.

18 Claims, 5 Drawing Sheets

MOUNTING OF OPTICAL ELEMENTS FOR IMAGING IN AIR VEHICLES

BACKGROUND

The disclosed subject matter relates generally to imaging apparatus and methods, and more specifically to optical elements usable in air vehicles and munitions.

Quality imaging optical components are made from crystalline and glass materials, which are very brittle and sensitive to stress concentrations and tensile stresses. Mounting of elements made from these materials for survival under high gravitational forces such as unmanned air vehicles, rockets, and gun launches can be very challenging due to catastrophic failure modes of these brittle materials. Any existing or new stress concentration can cause a fracture initiation point and the optical element can be prone to shattering. This can happen, for example, after long-term storage and transport, when the adhesive holding optical elements in place breaks down and regular vibrations cause contact between one or more optical elements and the housing holding them in place.

SUMMARY

In one embodiment, the present disclosure is directed to an optical assembly comprising a mounting structure, a plurality of optical elements, and a conformal filler material. The mounting structure has a plurality of axially spaced circumferentially recessed undercuts formed into an inner surface of the mounting structure. The optical elements are axially spaced in the mounting structure. At least one of the optical elements includes an undercut in a perimeter edge surface. The undercut is aligned with one of the plurality of undercuts in the mounting structure, such that the aligned circumferential undercuts define a void. The conformal filler material is cast in place in the void to create a mechanical lock between the optical element and mounting structure.

In another embodiment, the present disclosure is directed to a method for making an optical assembly. A mounting structure is provided having a plurality of axially spaced circumferential recessed undercuts formed into an inner surface of the mounting structure. A first optical element is inserted into a bore of the mounting structure, the first optical element including an undercut in a perimeter edge surface of the optical element. The undercut is aligned in the perimeter edge of the optical element with one of the plurality of undercuts in the mounting structure, such that the aligned circumferential undercuts define a void. A conformal filler material is cast in place into the void to create a mechanical lock between the optical element and mounting structure.

DETAILED DESCRIPTION

The present disclosure relates to an optical assembly and method of its assembly. This assembly includes a mounting structure that houses a plurality of axially spaced optical elements. Both the mounting structure and the optical elements have circumferential undercuts that are aligned when the optical elements are installed. These undercuts together define voids between each optical element and the mounting structure. Conformal filler material is cast in place into each void, thereby creating a resilient mechanical lock between each optical element and the mounting structure.

Figure 1:
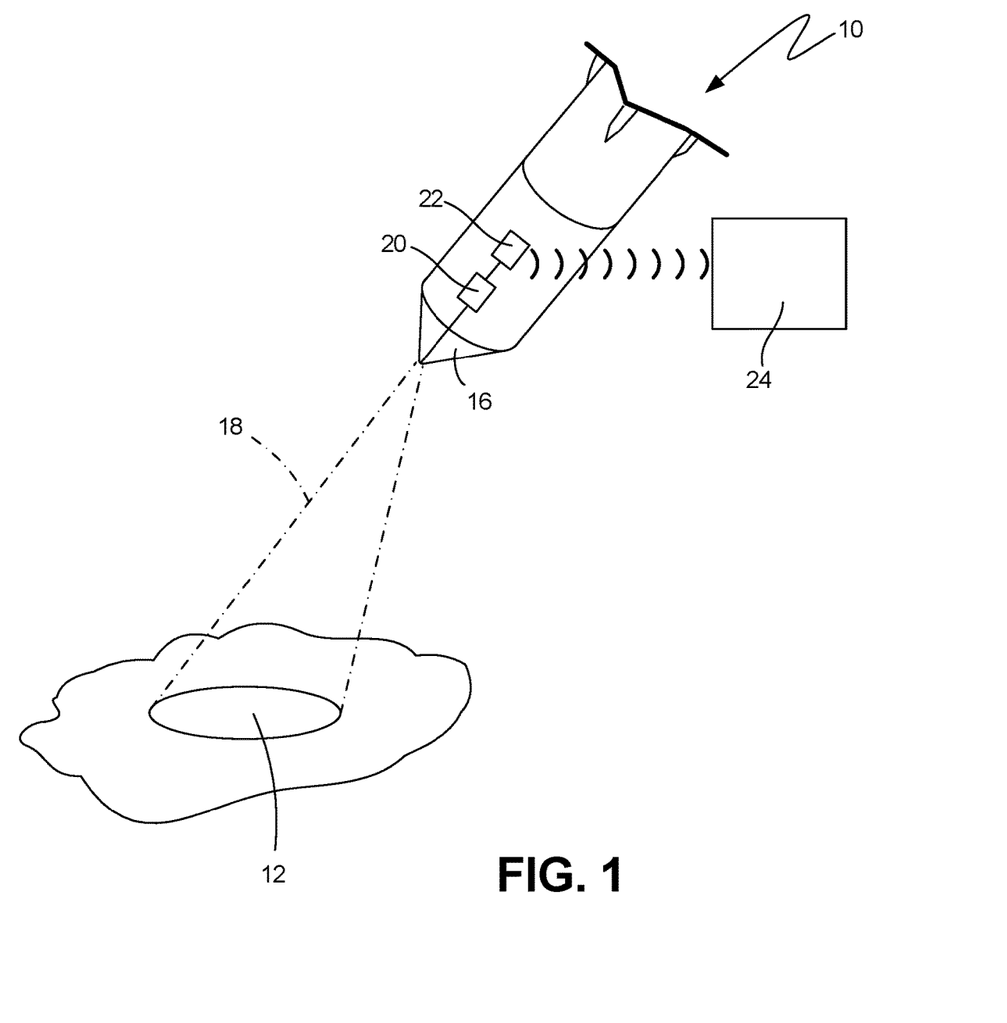
FIG. 1 shows an aerial vehicle in flight with an imaging system disposed at a forward end thereof.

FIG. 1 schematically depicts an air vehicle 10 in transit to a ground location 12. Air vehicle 10 can be an unmanned air vehicle (UAV), rocket, missile, or other munitions, though the disclosure is not so limited.

Air vehicle 10 is outfitted with an imaging system (not visible) at or near nose 16. The imaging system provides still images and/or video of some or all of view range 18. These images or videos are taken by a full-range imaging sensor 20, which is in communication with on-board controller 22. On-board controller 22 can, for example, use and process data from imaging sensor 20 for guidance purposes, and/or can include a wireless radio configured to communicate with external location 24, e.g. to transmit images or video to external location 24.

To provide the desired or optimal resolution for imaging sensor 20, the imaging system can include an embodiment of an optical assembly according to the present disclosure. One such non-limiting embodiment is shown in FIG. 2.

Figure 2:
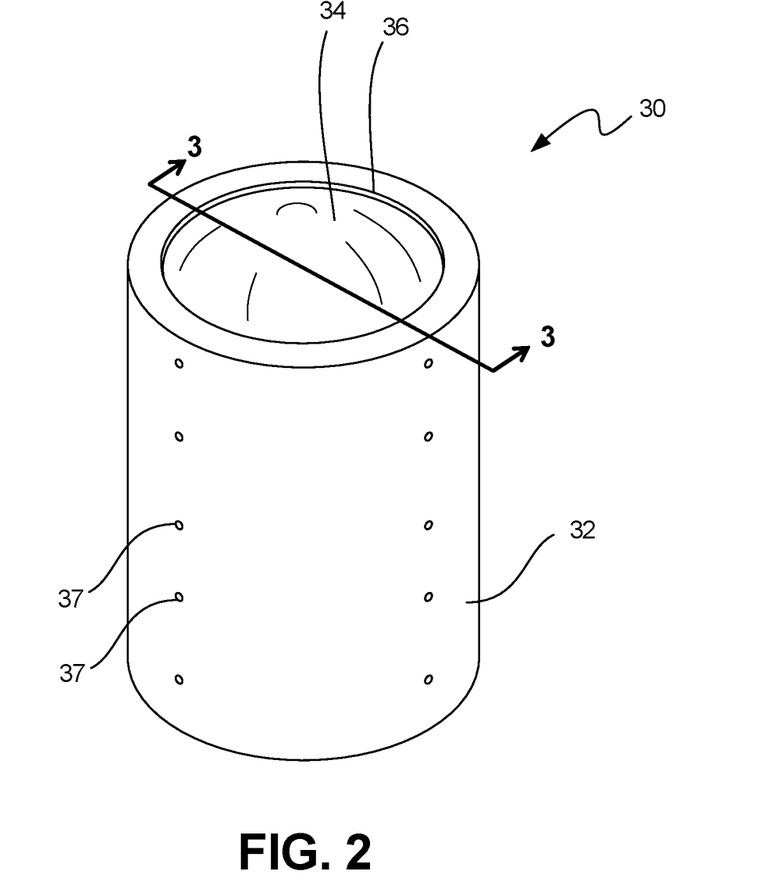
FIG. 2 is a perspective view of an optical assembly for the imaging system.
Figure 3:
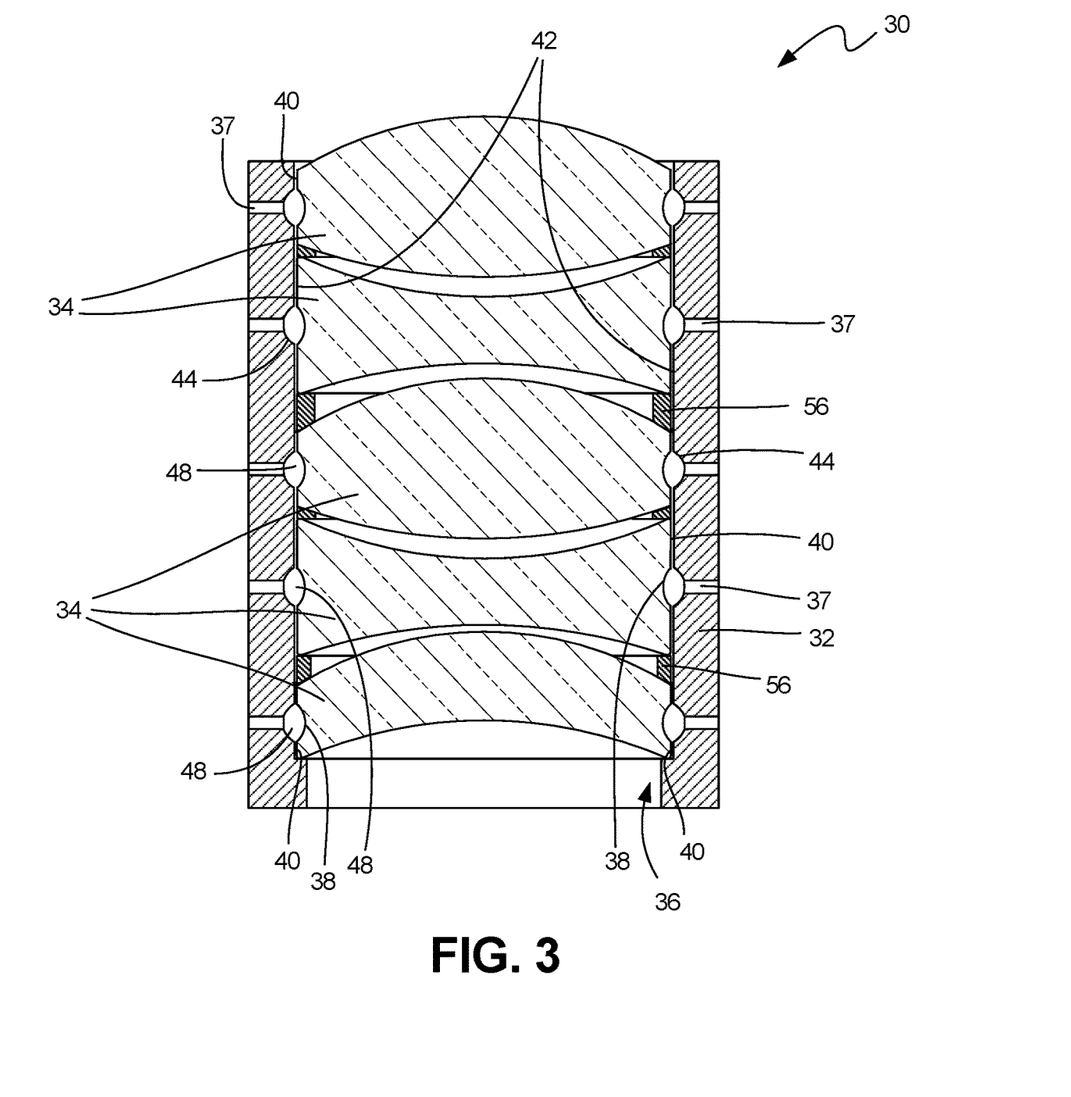
FIG. 3 is a sectional view of the optical assembly of FIG. 2.
Figure 4:
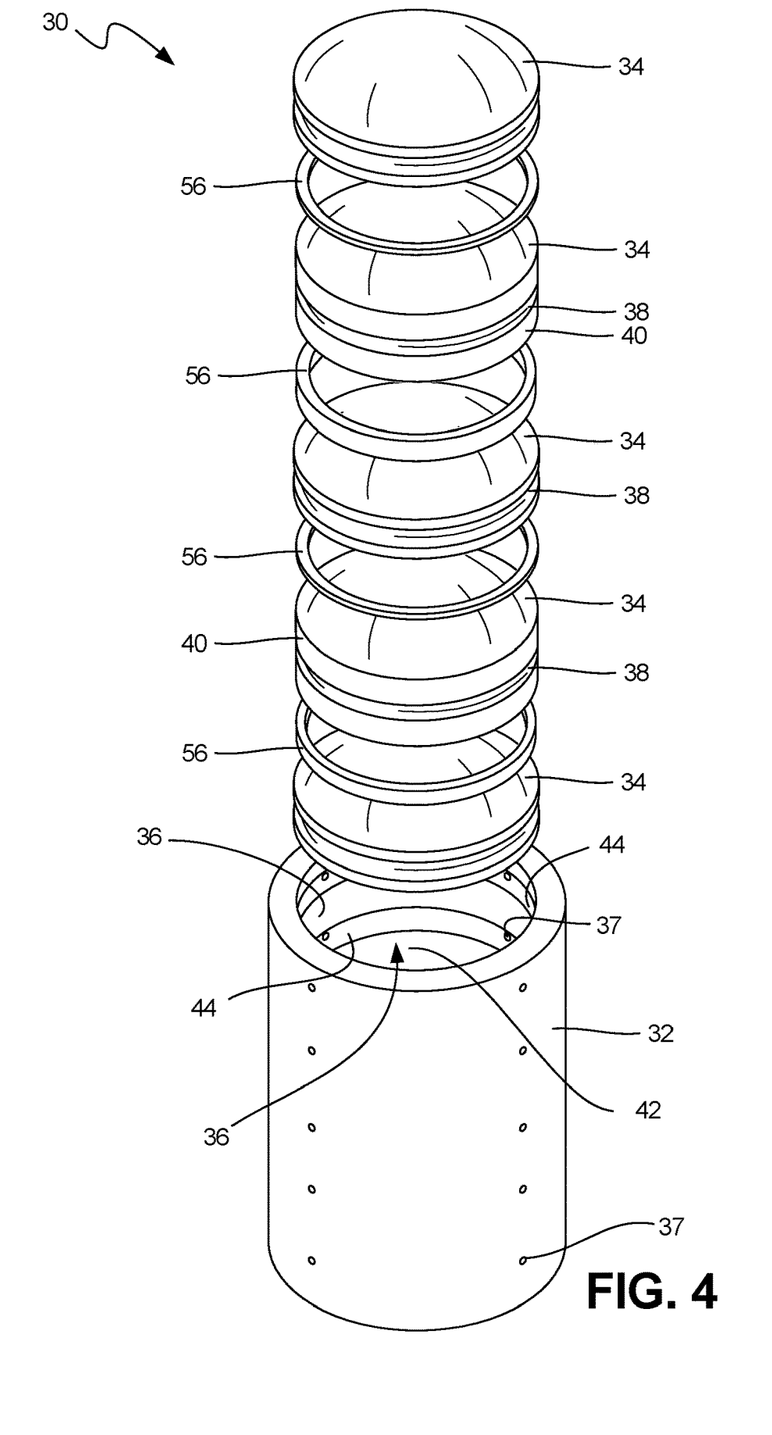
FIG. 4 shows an exploded view of the optical assembly of FIG. 2.

FIGS. 2, 3, and 4 depict optical assembly 30, an ordered series of lenses used for optical conditioning of light received by imaging sensor 20 of air vehicle 10. FIG. 2 is a perspective view of optical assembly 30 (illustrating section plane 3-3), FIG. 3 is a sectional view of optical assembly 30 through section line 3-3, and FIG. 4 is an exploded perspective view of optical assembly 30. FIGS. 2, 3, and 4 illustrate optical assembly 30 with mounting structure 32 and a plurality of optical elements 34 axially spaced in inner bore 36. FIGS. 3 and 4 depict additional details of mounting structure 32, optical elements 34, and bore 36, including ports 37, undercuts 38 in perimeter edge surface 40 of optical elements 34, and circumferential recessed undercuts 44 in inner surface 42 of mounting structure 32.

In the illustrated embodiment, mounting structure 32 is a substantially cylindrical structure that supports and retains several optical elements 34 at set axial positions within bore 36, a central axial passage extending through mounting structure 32. Inner surface 42 defines an inner surface of mounting structure 32 along bore 36. In the illustrated embodiment, inner surface 42 is generally cylindrical except where interrupted by circumferential recessed undercuts 44. Circumferential recessed undercuts 44 are annular grooves or channels disposed at axial locations along inner surface 42 corresponding to assembly locations of optical element 34. In at least some embodiments, inner surface 42 can have one or more circumferential recessed undercuts 44 for each optical element 34.

Optical elements 34 are lenses, prisms, mirrors, or other elements of an optical assembly. Each optical element 34 has a perimeter edge surface 40 defining an outer perimeter of the optical element. Undercuts 38 are annular grooves or channels disposed circumferentially about at least some optical elements 34, within perimeter edge surfaces 40. In some embodiments, each optical element 34 has at least one undercut 38. In other embodiments, some optical elements 34 may not include undercuts. During assembly of optical array 30, optical elements 34 are inserted into bore 36 of mounting structure 32 and aligned such that undercuts 38 face circumferential recessed undercuts 44. In this assembled state of optical assembly 30, alignment of each undercut 38 with a matching circumferential recessed undercut 44 in inner surface 42 defines voids 48.

Voids 48 are annular passages formed by and between perimeter edge surfaces 40 and inner surface 42. Voids 48 are filled with conformal filler material 54 (not shown in FIG. 2, 3, or 4, but discussed below with respect to FIGS. 7 and 8). In the depicted embodiment, when each optical element 34 is situated at its installation location within mounting structure 32, the optical element is surrounded by a single void 48. Voids 48 are accessible via ports 37, which in this embodiment extend fully and radially through mounting structure 32 and provide communication between an outer surface of mounting structure 32 and at least one circumferential recessed undercut 44. Each void 48 can be accessible via multiple ports 37; in the depicted embodiment (see FIG. 4), four radial ports 37 feed each void 48, though the ports could be of any suitable shape or direction. In certain embodiments, one or more ports 37 can be provided with a longitudinal component as well, either through mounting structure 32 and/or through one or more optical elements 34.

In the example, non-limiting embodiment shown, radial ports 37 are used to inject conformal filler 54 into voids 48 to resiliently secure optical elements 34 within mounting structure 32. Generally, depending on the exact application and required properties, conformal filler material 54, or a precursor thereof, can include polymers (such as injection molded materials), elastomers, cements, or adhesives such as epoxies, urethane, and polysulfides. Additionally and/or alternatively it can also include potting materials, hot melt adhesives, plasters, or other suitable materials that can be cast or injected into the void then subsequently cured or hardened. In certain embodiments, conformal filler material 54, or a precursor thereof, is selected from a group consisting of: epoxy, silicone, urethane resin, solder material, braze material, frit glass, ceramic cement, and combinations thereof.

The exploded view of FIG. 4 illustrates a method for making optical assembly 30. A first of the plurality of optical elements 34 is inserted into bore 36 of mounting structure 32, and positioned at its installation location (as discussed above) so as to define void 48. This optical element 34 is then secured within bore 36 by injection of conformal filler material 54 into void 48 via port(s) 37. This process can be repeated to successively install all optical elements 34 into mounting structure 32.

FIGS. 3 and 4 further illustrate spacers 56. Spacers 56 are situated between adjacent optical elements 34, and are sized to provide a desired relative axial spacing or positioning of each optical element 34. In some embodiments, optical assembly 30 can be formed by stacking all optical elements 34 and spacers 56 within bore 36, then injecting conformal filler material 54 to lock optical elements 34 in place.

Figure 5A:
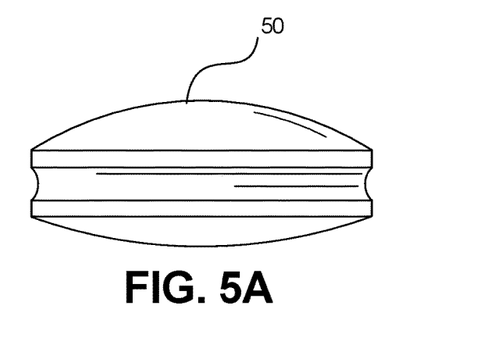
FIG. 5A is a side view of a first example optical element.
Figure 5B:
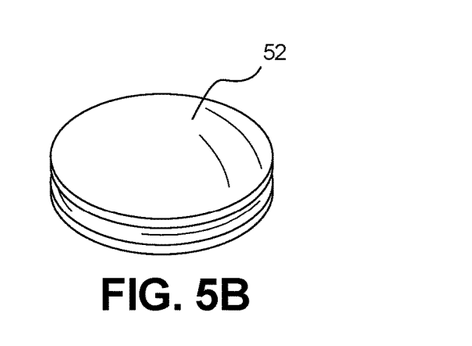
FIG. 5B is a perspective view of a second example optical element.

FIGS. 5A and 5B respectively show convex optical element 50 and concave optical element 52, each with undercut 38. In the non-limiting example embodiment shown in FIG. 4, alternating ones of convex optical element 50 and concave optical element 52 are inserted into bore 36. As discussed above, optical elements 34 can be separated by spacers 56, which are assembled between adjacent optical elements 34. In other embodiments, optical elements 34 can be spaced via steps or shelves of inner surface 42, as discussed below with respect to FIG. 7.

Figure 6:
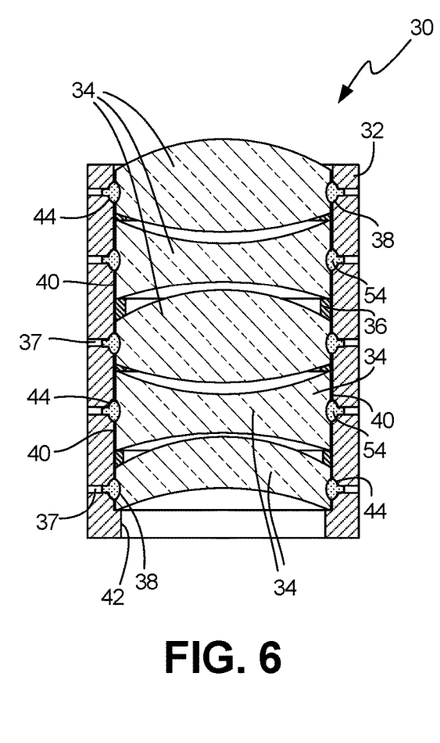
FIG. 6 is a sectional view of the assembly of FIG. 2, with conformal fills.
Figure 7:
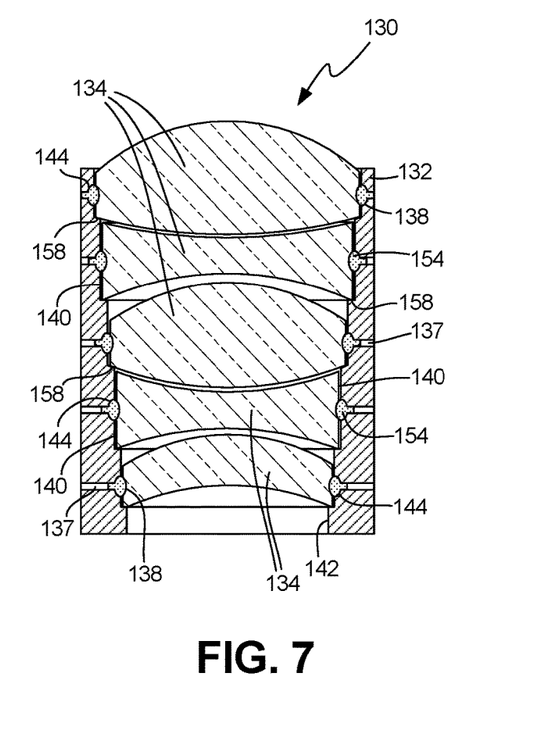
FIG. 7 is a sectional view of an alternative embodiment of the assembly of FIG. 7.

FIGS. 6 and 7 illustrate two embodiments of optical assembly 30, in a final (assembled) state. FIGS. 6 and 7 substantially parallel FIG. 3 (described above), but additionally illustrate conformal filler material 54 in place within voids 48.

FIG. 6 illustrates an embodiment wherein optical elements 34 are positioned axially by means of spacers 56. Spacers 56, as discussed above, determine an axial offset between adjacent optical elements 34 so as to align undercuts 38 with circumferential recessed undercuts 44. In the embodiment of FIG. 6, mounting structure 32 includes a cylindrical body and a central bore defined by a cylindrical inner surface 40. In some embodiments, spacers 56 can particularly be situated between adjacent convex optical elements 50 and concave optical elements 52.

FIG. 7 illustrates an alternative embodiment that eschews spacers 56 (see FIG. 6) in favor of steps 158. As illustrated in FIG. 7, optical elements 134 have decreasing diameter as a function of axial/longitudinal position, from top to bottom. In this embodiment of optical assembly 130, inner surface 142 of bore 136 has steps 158 at axial locations selected to support optical elements 134 with undercuts 138 facing circumferential recessed undercuts 144. Accordingly, the width of bore 136 increases in a stepwise fashion along the optical/longitudinal axis of optical assembly 130, between its open end and a receiving end. During assembly, successively larger-diameter optical elements 134 are placed into bore 136, and allowed to settle onto a step 158 of inner surface 142, such that the diameter of successive optical elements 134 increases in a matching stepwise fashion along the optical axis. Conformal filler material 154 locks optical elements 134 into place, once cured.

As shown in both FIG. 6 and FIG. 7, voids 48/148 (and in some embodiments at least a portion of ports 37/137) are filled with conformal filler material 54/154. Each undercut 38/138 in optical elements 34/134 is aligned with corresponding ones of the plurality of undercuts 44/144 in mounting structure 32/132, the aligned circumferential undercuts 38/138 and 44/144 defining axially spaced voids 48/148. Conformal filler material 54/154 can be cast in place in void(s) 48/148 to create a mechanical lock between each optical element 34/134 and inner surface 42/142 of mounting structure 32/132. This mechanical lock can be, for example, a compressive force independent of any adhesive properties that may or may not be provided by the selected filler material 54/154. For example, many installations utilizing such a system may be stored for long periods of time, exposed to extreme environmental and thermal variation, as well as vibrations from transport. Over time, any adhesive properties which may be present at the time of manufacture are prone to breaking down but the mechanical lock can remain for a much longer time period, extending the life of the product.

The conformal material selection for a gun hard application will be a mechanically stable structural material that also possesses properties to address CTE mismatches between the optical elements and the mounting structure. The filled void will create a mechanical lock between the optical element and mounting structure with high surface area in contact, so stress concentrations will be minimized with this configuration. This configuration will not need to rely on bond strength of the conformal material with either the optical element or the mounting structure. The undercut shapes in both components can also be "tuned" in size, location, and geometry to impart compressive stresses on the more vulnerable locations of the optical elements during high acceleration environments like a gun launch.

Optical array 30 is formed by inserting optical elements 34 within mounting structure 32, then performing a casting step wherein conformal filler material 54 is injected into resulting voids 48 and cured or otherwise allowed to harden into rigid locking elements disposed between inner surface 42 of mounting structure 32 and perimeter edge surface 40 of optical elements 34. To position optical elements 34/134 at appropriate axial locations within bore 36/136, optical assembly 30/130 can include spacers 56 disposed between adjacent optical elements (see FIG. 6), or can have steps 158 along inner surface 142 (see FIG. 7). In some embodiments, optical array 30 may include both steps and spacers to position optical elements 34.

The aforementioned casting step comprises injecting a curable filler material into a plurality of ports, such as a radial port providing communication between an outer surface of the mounting structure and at least one of the circumferential recessed undercuts; and curing the filler material to form the mechanical lock. The mechanical lock can include a residual compressive force between the mounting structure and the optical element independent of any adhesive bond which may exist. As noted above, the conformal filler material, or a precursor thereof, is selected from a group consisting of: epoxy, silicone, urethane resin, solder material, braze material, frit glass, ceramic cement, and combinations thereof.

As disclosed herein, optical assembly 30/130 includes a plurality of optical elements 34/134 locked into mounting assembly 32/132 by the injection and curing of conformal filler material 52/152 to form a durable structure capable of withstanding heavy acceleration loads with minimal crack initiation or other damage to sensitive imaging components.

Discussion of Possible Embodiments

The following are non-exclusive descriptions of possible embodiments of the present invention.

An optical assembly comprising: a mounting structure including a plurality of axially spaced circumferential recessed undercuts formed into an inner surface of the mounting structure; a plurality of optical elements axially spaced in the mounting structure, at least one of the plurality of optical elements including an undercut in a perimeter edge surface of the optical element, the undercut in the perimeter edge aligned with one of the plurality of undercuts in the mounting structure, the aligned circumferential undercuts defining a void; and a conformal filler material cast in place in the void to create a mechanical lock between the optical element and mounting structure.

The optical assembly of the preceding paragraph can optionally include, additionally and/or alternatively, any one or more of the following features, configurations and/or additional components:

A further embodiment of the foregoing optical assembly, wherein the mounting structure further comprises: a plurality of ports providing communication between an outer surface of the mounting structure and at least one of the circumferential recessed undercuts.

A further embodiment of the foregoing optical assembly, wherein the mounting structure includes a cylindrical body and a central bore defined by the inner surface.

A further embodiment of the foregoing optical assembly, wherein a width of the central bore increases stepwise along an optical axis between the open end and the receiving end.

A further embodiment of the foregoing optical assembly, wherein corresponding ones of the plurality of optical elements have a diameter increasing stepwise along the optical axis.

A further embodiment of the foregoing optical assembly, wherein the conformal filler material, or a precursor thereof, is selected from a group consisting of: epoxy, silicone, urethane resin, solder material, braze material, frit glass, ceramic cement, and combinations thereof.

A further embodiment of the foregoing optical assembly, further comprising: a full-range image sensor disposed at a receiving end of the optical assembly.

A further embodiment of the foregoing optical assembly, wherein the image sensor is connected to a wireless communication system for transmitting a sensed image to an external location.

A further embodiment of the foregoing optical assembly, wherein the plurality of optical elements including alternating ones of a convex optical element and a concave optical element.

A further embodiment of the foregoing optical assembly, further comprising: a plurality of spacers disposed between adjacent ones of the convex optical element and the concave optical element.

A method for making an optical assembly, the method comprising: providing a mounting structure including a plurality of axially spaced circumferential recessed undercuts formed into an inner surface of the mounting structure; inserting a first optical element into a bore of the mounting structure, the first optical element including an undercut in a perimeter edge surface of the optical element; aligning the undercut in the perimeter edge of the optical element with one of the plurality of undercuts in the mounting structure, the aligned circumferential undercuts defining a void; and casting a conformal filler material in place into the void to create a mechanical lock between the optical element and mounting structure.

The method of the preceding paragraph can optionally include, additionally and/or alternatively, any one or more of the following features, configurations and/or additional components:

A further embodiment of the foregoing method, further comprising: after the inserting step, inserting a plurality of axially spaced optical elements into the bore of the mounting structure, each of the plurality of axially spaced optical elements having an undercut in a perimeter edge surface.

A further embodiment of the foregoing method, further comprising: aligning the undercut in the perimeter edge of each of the plurality of optical elements with corresponding ones of the plurality of recessed undercuts in the inner surface of the mounting structure to define a plurality of axially spaced voids; casting a conformal filler material in place in each of the plurality of voids to create a mechanical lock between the optical element and mounting structure.

A further embodiment of the foregoing method, wherein the plurality of optical elements including alternating ones of a convex optical element and a concave optical element.

A further embodiment of the foregoing method, further comprising: assembling a plurality of spacers between adjacent ones of the plurality of optical elements.

A further embodiment of the foregoing method, wherein a width of the central bore increases stepwise along an optical axis between the open end and the receiving end.

A further embodiment of the foregoing method, wherein corresponding ones of the plurality of optical elements have a diameter increasing stepwise along the optical axis.

A further embodiment of the foregoing method, wherein the casting step comprises: injecting a curable filler material into a plurality of ports providing communication between an outer surface of the mounting structure and at least one of the circumferential recessed undercuts; and curing the filler material to form the mechanical lock; wherein the mechanical lock is a residual compressive force between the mounting structure and the optical element independent of any adhesive bond which may exist.

A further embodiment of the foregoing method, wherein the conformal filler material, or a precursor thereof, is selected from a group consisting of: epoxy, silicone, urethane resin, solder material, braze material, frit glass, ceramic cement, and combinations thereof.

A further embodiment of the foregoing method, further comprising: installing a full-range image sensor at a receiving end of the optical assembly.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An optical assembly comprising:
   a mounting structure including a plurality of axially spaced circumferential recessed undercuts formed into an inner surface of the mounting structure;
   a plurality of optical elements axially spaced in the mounting structure, at least one of the plurality of optical elements including an undercut in a perimeter edge surface of the optical element, the undercut in the perimeter edge aligned with one of the plurality of undercuts in the mounting structure, the aligned circumferential undercuts defining a void; and
   a conformal filler material cast in place in the void to create a mechanical lock between the optical element and mounting structures;
   wherein the conformal filler material, or a precursor thereof, is selected from a group consisting of: epoxy, silicone, urethane resin, solder material, braze material, frit glass, ceramic cement, and combinations thereof.

2. The optical assembly of claim 1, wherein the mounting structure further comprises:
   a plurality of ports providing communication between an outer surface of the mounting structure and at least one of the circumferential recessed undercuts.

3. The optical assembly of claim 1, wherein the mounting structure includes a cylindrical body and a central bore defined by the inner surface.

4. The optical assembly of claim 3, wherein a width of the central bore increases stepwise along an optical axis between the open end and the receiving end.

5. The optical assembly of claim 4, wherein corresponding ones of the plurality of optical elements have a diameter increasing stepwise along the optical axis.

6. The optical assembly of claim 1, further comprising:
   a full-range image sensor disposed at a receiving end of the optical assembly.

7. The optical assembly of claim 6, wherein the image sensor is connected to a wireless communication system for transmitting a sensed image to an external location.

8. The optical assembly of claim 7, further comprising:
   a plurality of spacers disposed between adjacent ones of the convex optical element and the concave optical element.

9. The optical assembly of claim 1, wherein the plurality of optical elements including alternating ones of a convex optical element and a concave optical element.

10. A method for making an optical assembly, the method comprising:
    providing a mounting structure including a plurality of axially spaced circumferential recessed undercuts formed into an inner surface of the mounting structure;
    inserting a first optical element into a bore of the mounting structure, the first optical element including an undercut in a perimeter edge surface of the optical element;
    aligning the undercut in the perimeter edge of the optical element with one of the plurality of undercuts in the mounting structure, the aligned circumferential undercuts defining a void; and
    casting a conformal filler material in place into the void to create a mechanical lock between the optical element and mounting structures,
    wherein the casting step comprises:
    injecting a curable filler material into a plurality of ports providing communication between an outer surface of the mounting structure and at least one of the circumferential recessed undercuts; and
    curing the filler material to form the mechanical lock;
    wherein the mechanical lock is a residual compressive force between the mounting structure and the optical element independent of any adhesive bond which may exist.

11. The method of claim 10, further comprising:
    after the inserting step, inserting a plurality of axially spaced optical elements into the bore of the mounting structure, each of the plurality of axially spaced optical elements having an undercut in a perimeter edge surface.

12. The method of claim 11, further comprising:
    aligning the undercut in the perimeter edge of each of the plurality of optical elements with corresponding ones of the plurality of recessed undercuts in the inner surface of the mounting structure to define a plurality of axially spaced voids; and
    casting a conformal filler material in place in each of the plurality of voids to create a mechanical lock between the optical element and mounting structure.

13. The method of claim 12, wherein the plurality of optical elements including alternating ones of a convex optical element and a concave optical element.

14. The method of claim 12, further comprising:
    assembling a plurality of spacers between adjacent ones of the plurality of optical elements.

15. The method of claim 10, wherein a width of a central bore increases stepwise along an optical axis between the open end and the receiving end.

16. The method of claim 15, wherein corresponding ones of the plurality of optical elements have a diameter increasing stepwise along the optical axis.

17. The method of claim 10, wherein the conformal filler material, or a precursor thereof, is selected from a group consisting of: epoxy, silicone, urethane resin, solder material, braze material, frit glass, ceramic cement, and combinations thereof.

18. The method of claim 10, further comprising:
   installing a full-range image sensor at a receiving end of the optical assembly.

* * * * *